(12) United States Patent
Drinkwater

(10) Patent No.: US 6,765,704 B2
(45) Date of Patent: Jul. 20, 2004

(54) OPTICAL DEVICE

(75) Inventor: John Drinkwater, Andover (GB)

(73) Assignee: Optaglio Limited, Swindon (GB)

( * ) Notice: Subject to any disclaimer, the term of this patent is extended or adjusted under 35 U.S.C. 154(b) by 0 days.

(21) Appl. No.: 10/312,320

(22) PCT Filed: Jul. 2, 2001

(86) PCT No.: PCT/GB01/02931
§ 371 (c)(1),
(2), (4) Date: Apr. 7, 2003

(87) PCT Pub. No.: WO02/02351
PCT Pub. Date: Jan. 10, 2002

(65) Prior Publication Data
US 2003/0174373 A1 Sep. 18, 2003

(30) Foreign Application Priority Data
Jul. 3, 2000 (GB) .............................................. 0016358

(51) Int. Cl.⁷ ................................................. G03H 1/00
(52) U.S. Cl. ............................ 359/2; 359/567; 359/15; 283/72; 283/86

(56) References Cited

U.S. PATENT DOCUMENTS

| | | | |
|---|---|---|---|
| 4,206,965 A | 6/1980 | McGrew | |
| 4,544,266 A | 10/1985 | Antes | |
| 4,568,141 A | 2/1986 | Antes | |
| 4,576,439 A | 3/1986 | Gale et al. | |
| 4,629,282 A | 12/1986 | McGrew | |

(List continued on next page.)

FOREIGN PATENT DOCUMENTS

| | | |
|---|---|---|
| DE | 196 12 819 A1 | 10/1997 |
| EP | 0 651 365 A1 | 5/1995 |
| EP | 0 919 961 A2 | 6/1999 |
| GB | 2 149 532 A | 6/1985 |
| GB | 2 243 139 A | 10/1991 |
| WO | WO 93 18419 A1 | 9/1993 |
| WO | WO 94 24615 A1 | 10/1994 |
| WO | WO 95 02200 A1 | 1/1995 |
| WO | WO 95 34008 A1 | 12/1995 |
| WO | WO 98 08691 A1 | 3/1998 |
| WO | WO 99 04364 A1 | 1/1999 |
| WO | WO 99 36271 A1 | 7/1999 |
| WO | WO 99 59036 A1 | 11/1999 |
| WO | WO 00 30043 A1 | 5/2000 |

OTHER PUBLICATIONS

Burckhardt, C.B., "Display of Holograms in White Light" The Ball System Technical Journal, Dec. 1966, pp. 1841–1844.

Hariharan, P., "Colour Holography", *E. Wolf, Progress in Optics Vol. XX*, p. 285–324, North–Holland, 1983, Oxford, Amsterdam New York, US.

Tedesco, James M., "Holographic Diffusers for LCD Cockpit Displays", Proceedings of the SPIE, 1994, vol. 2219, pp. 327–337, Bellingham, VA, US.

*Primary Examiner*—Leo Boutsikaris
(74) *Attorney, Agent, or Firm*—Townsend and Townsend and Crew LLP

(57) ABSTRACT

An optical device for security and anti-counterfeit applications comprises a holographic diffractive structure (8) that generates a holographic optically variable image by diffraction that consists of at least two separate substantially co-located linear regions that generate in response to white light illumination a visually observable holographic image consisting of at least two defined graphical elements and which generates in response to coherent illumination (1) at least two covert images (5, 6, 7) focussed at a separate image plane a distance away from the real physical plane of the device, each covert image (5, 6, 7) corresponding to the replay from one of the linear regions, each covert image (5, 6, 7) being separated on its image plane from the adjacent covert image (5, 6, 7) by at least its own dimensions.

29 Claims, 8 Drawing Sheets

U.S. PATENT DOCUMENTS

| | | |
|---|---|---|
| 5,101,184 A | 3/1992 | Antes |
| 5,138,471 A | 8/1992 | McGrew |
| 5,331,443 A | 7/1994 | Stanisci |
| 5,351,142 A * | 9/1994 | Cueli .................... 359/2 |
| 5,461,239 A | 10/1995 | Atherton |
| 5,513,019 A | 4/1996 | Cueli |
| 5,582,434 A | 12/1996 | Skov et al. |
| 5,658,411 A | 8/1997 | Faykish |
| 5,659,408 A | 8/1997 | Wenyon |
| 5,694,229 A | 12/1997 | Drinkwater |
| 5,815,292 A | 9/1998 | Walters |
| 5,825,475 A * | 10/1998 | Formosa .................... 356/71 |
| 5,856,070 A | 1/1999 | Korth |
| 5,971,277 A | 10/1999 | Cragun et al. |
| 6,036,807 A | 3/2000 | Brongers |
| 6,062,604 A | 5/2000 | Hardwick et al. |
| 6,088,161 A | 7/2000 | Lee |
| 6,157,474 A | 12/2000 | Orr et al. |
| 6,414,761 B1 * | 7/2002 | Stepanek .................... 359/2 |

* cited by examiner

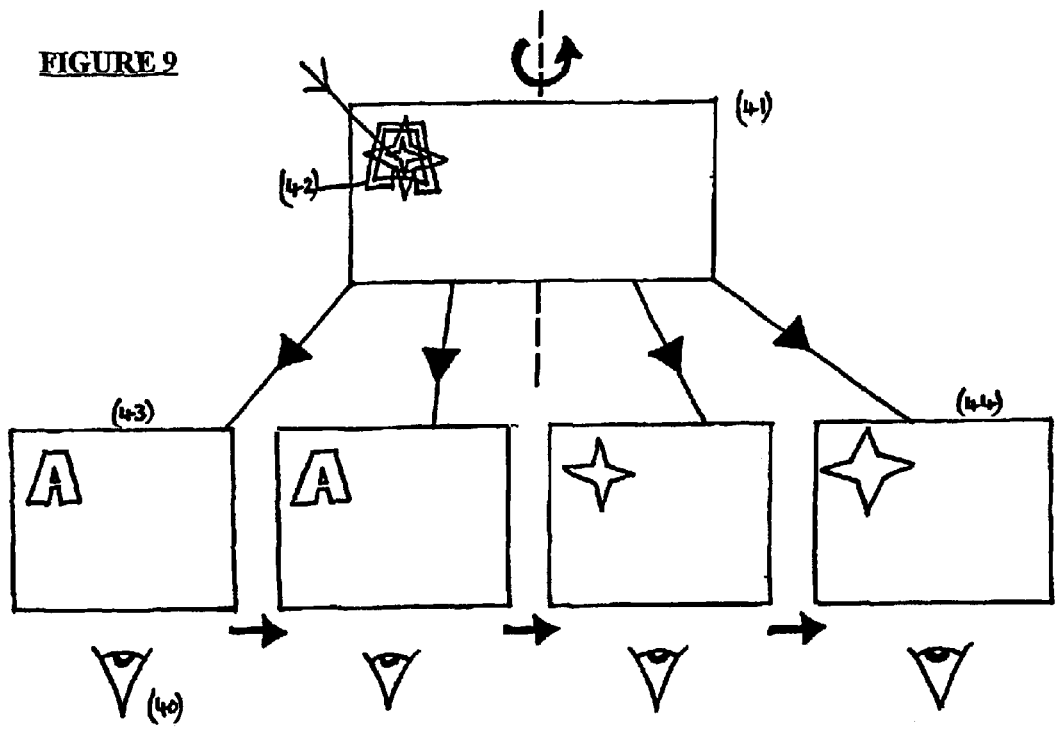
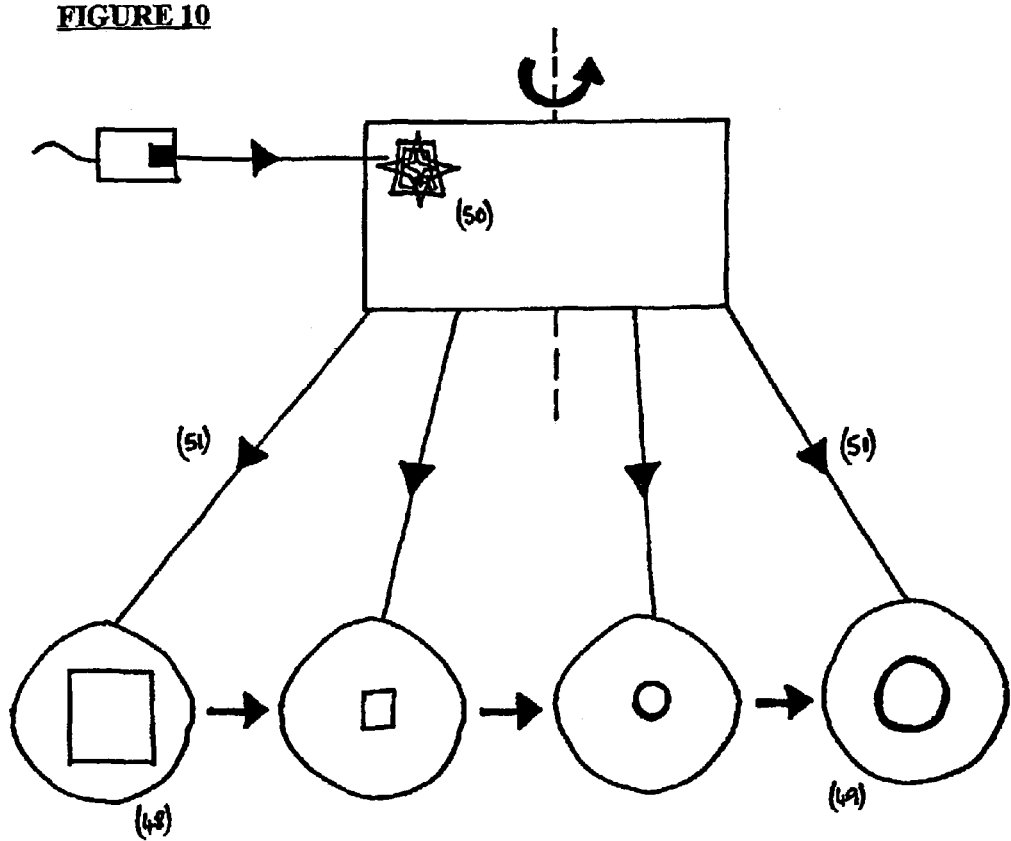

OPTICAL DEVICE

This invention is in the field of security anti-counterfeit devices operating on the principle of optical diffraction and relates to an improved form of optical security device for use in the protection of documents and articles of value from counterfeit and to verify authenticity.

Several forms of such devices are now used to prove the authenticity of items of value and to prevent their fraudulent duplication for example for banknotes, plastic cards, value documents such as fiscal stamps, travel documents such as passports and for the authentication of valuable goods.

Devices based on the principle of optical diffraction are often used for these purposes because they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognisable and cannot be duplicated by print technologies, and because specific and difficult to replicate optical and engineering techniques are required for their production.

These diffractive optically variable image forming devices are generally manufactured and from their effects base on holographic or pure diffraction grating techniques and are often manufactured as embossed surface relief structures as known in the art (e.g. Graham Saxby "Practical Holography" Prentice Hall 1988). They are typically applied to documents of value, plastic cards and articles of value to be protected in the form of holographic or diffractive hot stamping foil or holographic or diffractive labelling, often tamper evident.

These are various forms of pure diffraction grating devices already revealed and in use as such security devices. One example would be U.S. Pat. No. 4,568,141, which reveals a diffraction optical authenticating element that provides a colour pattern moving at a predetermined velocity along a predetermined track when the document is illuminated from a first direction and viewed from a second direction. This device consists of a plane diffraction grating structure which defines a predetermined track where at least one of whose spatial frequency or angular orientation varies along said track such that when the device is illuminated and rotated in a plane adjacent region of diffraction grating structure successively diffract light to cause a viewer to see a colour pattern which appears to move along said movement track. Each element of this device is a pure plane diffraction grating which will not form an out of plane coherently viewable image. A manufacturing method for such a security diffraction grating master is revealed in U.S. Pat. No. 4,761,252 the technique using a punch to impress successive small areas of a flexible embossing die into a sheet of thermoplastic material. U.S. Pat. No. 5,034,003 reveals another form of optical security device using diffraction gratings to produce a switching image by recording the device as sets of pixels with each pixel consisting of small areas of different grating spatial frequencies and orientations to form a diffracted image visible from different directions. The teachings of these patents are incorporated by reference. Again this device only forms images located on the image plane of the device. There is no provision of additional images formed under coherent light. Another form of pure diffraction grating security device and another method of producing the same is to directly write the diffractive structure by use of electron beam lithography—some examples of this are WOA9318419, WOA9504948 and WOA9502200, describing electron beam generated diffractive optical security devices. Again these teachings do not anticipate devices that create an additional out of plane image, viewable under coherent illumination.

Diffractive optical variable image forming devices are also known and have been produced by holographic methods, such devices are known for their use in security applications for example on credit cards, banknotes, etc. Examples of teachings on such holographically manufactured security structures can be found in U.S. Pat. Nos. 5,694,229, 5,483,363 and WO9959036. The optical recording and manufacturing methods and other teachings of these patents are incorporated by reference. Again these teachings do not anticipate an additional covert feature with an additional image becoming viewable under coherent illumination.

Some teachings already exist on machine readable or coherently viewable holographic or diffractive structures as used for security, for example U.S. Pat. No. 4,544,266 reveals the authentication of a document by the use of a machine readable diffraction based encoded mark that is difficult to copy, and U.S. Pat. No. 5,101,184 describes another way of machine reading a diffractive security device by detecting the different intensities of diffracted light produced in different directions by asymmetric relief structures. However, neither of these teaching reveals the formation of a coherently viewable image.

Another security device consisting of a volume hologram contains a visually viewable hologram combined with a superimposed laser transmission hologram is revealed in DE-A-3840037, where the laser transmission hologram image is designed to be non-discernable under white light but designed to be read under coherent laser light using a visualiser or machine reader device.

U.S. Pat. No. 5,483,363 describes how an embossed surface relief hologram can contain a superimposed second diffractive structure designed to be machine readable by creating an out of plane image. However, in this teaching the second structure is superimposed over the whole area of the first and is designed to be completely non-visible to an observer by the use of superimposed very weak diffraction gratings which do not form an out of plane image but where the visual diffraction image is suppressed upon illumination to allow detection of the out of plane machine readable image. The problems with these two above devices is that the hidden images were distributed over the whole area of the device including over the visual image generating diffractive structure, and therefore tend to interfere with and degrade the visual image from the device so requiring the diffractive structures corresponding to the hidden images to be relatively low in efficiency compared to the main visual image or resulting in competition and degradation.

Another holographic system and method for determining which of a plurality of visually indistinguishable objects have been marked with a covert indicator is explained in U.S. Pat. No. 5,825,475 which reveals a number of usually indistinguishable objects some of which have been marked with a covert holographic indicator which is exposed to be viewed but which is detectable only when illuminated with a coherent reference light of predetermined wavelength designed to be evaluated by a specific form of scanner evaluation unit.

A known holographic system for forming a covert coherently viewable image uses a hologram containing a matt area some 1.5–2 mm in diameter, which upon laser illumination generates an out of plane image consisting of text. The drawback with this device is that area containing the covert feature appears obviously matt and different in appearance to the holographic areas and the visually discerned replay appears non-holographic due to the large range of spatial frequencies recorded into it which compete. This effect reduces the diffraction efficiency and hence the brightness and also reduces the clarity (i.e. increasing the noise) of the out of plane image and reduces the angular separation that can be achieved between the various out of plane image elements without causing severe fringe competition and degradation of the replay.

Another known system used to form a coherently viewable image is a hologram that contains an area of discrete small dots, spaced apart over a distance of a few millimetres which generates under laser illumination two covert out of plane images each mapping to a pair of dots. This technique has the disadvantage of being hard to reilluminate or view for an inspector because the target area to be illuminated is very small and precisely located so that the observation of a complete covert image of uniform brightness requires extremely careful alignment of the re-illuminating source.

Accordingly, the current invention seeks to provide an optical structure having advantages over known such devices.

According to one aspect of the current invention there is an optical device comprising a holographic diffractive structure comprising at least two discrete linear regions arranged to replay in response to white light illumination a visual holographic optically variable image comprising a plurality of visually discernable linear graphical elements corresponding to respective linear regions, wherein the graphical elements are located at or near the physical plane containing the holographic diffractive structure, and arranged to replay in response to coherent light illumination a plurality of secondary covert images corresponding to the respective linear regions wherein-the secondary covert images are visible to an observer when imaged at a separate image plane away from the physical plane containing the holographic diffractive structure, the plurality of secondary covert images being arranged to be non-visible under white light illumination, and wherein the secondary covert images are reconstructed at different positions at their image plane.

In this invention, a new optical security device for use in security applications is described. This consists of a holographic diffractive surface relief structure generating a holographic optically variable image by the process of diffraction of light, which when illuminated by coherent laser light generates at least two covert images each corresponding to one of the linear regions, the covert images being in the form of alphanumeric characters or other graphic indicia, the covert images forming focussed images at a separate image plane a distance away from the physical plane containing the diffractive structure and the covert images being non-visible under white light illumination.

The object of this invention is to provide an improvement upon the above devices in particular to record a covert coherently viewable out of plane image within a security holographic or other form of diffractive structure, without degrading the visual security diffractive image but whilst making re-illumination and inspection of the device very straightforward for even a relatively unskilled inspector. This is achieved by ensuring the readable area for the device is spread over a relatively large area of the hologram or diffractive device to make alignment for readout and interrogation significantly easier than in previous devices and thus to make identification of the covert image more straightforward. This new device would thus improve on the previous teachings. In some of the previous teachings the interrogatable coherently viewable structure was spread over the entire area of the device thus resulting in either a degraded visual authentication device or a weak coherently detectable structure. In other previous work the coherent structure was highly localised into small areas making unskilled interrogation particularly in the field relatively difficult in terms of locating and aligning to the desired feature. In other previous work the coherently viewable image structure was recorded in a defined large area but the clarity and quality and brightness of the coherently viewable image suffered from severe degradation and limitations on quality and information content due to the high information content and hence large number of spatial frequencies competing within the recording area of the coherently viewable image and also making the area containing the covert coherently viewable information matt in appearance and so very obviously visually different in appearance to the purely holographic or diffractive areas of a device.

It is also an object of this invention to provide a coherently viewable covert image system that is significantly more secure and difficult to counterfeit or remanufacture than the previous systems. Here it is an objective that the coherently viewable structure should appear to be an integrated part of the security image, and sometimes for example demonstrating apparent optical movements and thus adding to the overall security and visual public recognition value of the device and requiring more sophisticated techniques for manufacture.

In this invention, an optical security device for use in security applications consists of a holographic diffractive surface relief structure generating a holographic optically variable image by the process of diffraction of light, which has at least two separate substantially co-located linear regions, which generate in response to white light illumination a diffractive optically variable image consisting of at least two visually discernable defined linear graphical elements corresponding to each linear region located at or near the physical plane containing the surface relief structure, and which when illuminated by coherent laser light generates at least two covert images each corresponding to one of the linear regions, the covert images being in the form of alphanumeric characters or other graphic indicia, the covert images forming focussed images at a separate image plane a distance away from the physical plane containing the diffractive structure, the covert images being non-visible under white light illumination and the covert images being reconstructed at different angles to a reference co-ordinate system for the device so that the focussed images formed by the covert image areas are separated on their image plane.

By holographic diffractive surface relief structure we refer to an embossed holographic or diffraction grating structure as known in the art which generates a holographic optically variable image—for example a security hologram—where the master image has preferably been recorded using a holographic H1–H2 process. Within this term we specifically mean a surface relief structure capable of generating a first image of a defined linear region close to the physical plane of the device for visual viewing and also capable of generating a second covert coherently viewable image, non-visible under white light but capable of being visualised under laser light to form a second focussed graphic image at a distance from the real plane of the device, this distance typically being in the range 150 mm to 300 mm. In one preferred embodiment of this invention these special holographic structures would be combined as one component of a main holographic security image containing a mixture of rainbow holographic and purely diffractive elements. Suitable structures, in some respects superior, can also be manufactured by calculation and direct writing of the holographic fringe structure using lithographic techniques and particularly electron beam techniques as known in the art. These special holographic structures could also be combined (for example using a mechanical recombination process) with other pure diffraction grating based devices as known in the field such as, for example, a "kinegram" or a computer calculated and direct written diffractive structure recorded by for example an electron beam lithography system such as the device known as an "Exelgram".

Upon laser reconstruction and imaging the covert images will generally replay at different angles to a reference co-ordinate system for the device (typically a reference plane containing the physical plane of the device and a normal to the device). They will thus replay at different angles to the normal to the device and would normally have an angular separation of the some size or greater than their angular sub-tense to ensure minimal cross-talk between them and ease of viewing. Thus when the covert images form their focussed images at a plane away from the real plane of the device the covert images will be separated on their image plane by at least a distance corresponding to the dimensions of the covert images.

A particularly suitable form of diffractive surface relief structure usable for generating this type of effect is one manufactured by a holographic recording process using an H1–H2 process as known in the art and as referenced, by recording a surface relief image typically into photoresist but using a process where the rainbow slit is replaced by a mask over the H1 in the form of the covert image to be recorded.

Another useful and preferred form of diffractive surface relief structure usable for generating this type of effect would be an equivalent structure generated by the technique of electron beam lithography, where a computer is used to pre-calculate the microscopic diffraction grating structure which is then directly written into a photoresist recording medium. In a preferred and more secure form of the device when generated by electron beam techniques the projected image could be non-symmetric about the axis by the use of pre-calculated computer generated techniques and direct writing of the structures by, for example electron beam techniques, to generate asymmetric structures, where the covert coherently viewable image only replays one diffraction order substantially and so has a replay that is not symmetric about the specular reflection and thus of an increased security value against holographic counterfeit by re-origination of the structure. A particularly useful method for generating electron beam generated structure of the correct replay property is to form repeated groups of pixels or other shapes consisting of groups of very similar diffraction gratings, varying slightly in pitch and orientation between them, and arranged to generate the designed covert out of plane image by the superposition of their diffracted replays.

By the term 'linear region' we mean a defined area of the device with one dimension significantly larger than the other by a factor of at least 5 times and preferably typically 10 or more times, whose visual image would be a straight or curved line structure, for example such as seen in guilloche patterns as known in the security printing field. By the term "substantially co-located" we mean that the linear regions in question are located adjacent or close to each other for a substantial proportion of their length—typically within 3 to 4 line widths over a significant proportion of their length, approximately at least 10% of their length and sometimes typically 20% or more of their length, or possibly instead of being adjacent that the linear structures inter-lock, or intertwine or cross over each other in an interlocking pattern or co-operate in some other way so that portions of each linear structure remain close to each other over a substantial part of their length. This is to ensure that sampling using a re-illumination device covering a small surface area will illuminate for reconstruction all elements of the linear features when illuminating randomly over a relatively large area of the whole optical security device so that all elements of the coherently viewable image are replayed together for inspection. This is to enable, for example, a laser pointer of beam diameter approximately 1.5 mm to generate a bright and easily viewable coherently replayed image by fully and evenly illuminating both (or all) linear regions. These features of this device make authentication by a less skilled inspector in less than ideal field conditions more straight-forward than for previous devices by easing the alignment requirement for interrogation so that the device can be positively authenticated without the need for careful alignment. Typical dimensions of such a linear structure would be typically 0.15 mm to 0.75 mm wide and a line length of minimally around 2 mm to 2.5 mm but typically substantially greater lengths typically correspondingly 5 mm to 10 mm or more would be expected to allow the formation of, for example, animated linear guilloche patterns and the like and to ensure the device is easily detectable and readable over a relatively large area (in comparison to previous localised devices) of the whole security device. Thus in this new device the linear regions and interlocking linear patterns containing the covert codes extended over a fairly large dimension on the optical device, typically 5 mm plus to provide an area of over 3 mm square and usually substantially greater, typically 5×5 mm or 5×1 mm in some cases a larger area extending over a much large proportion of the device than in the prior art, though still without degrading the visual security image.

By the term linear structure as above in a usual embodiment of this device the line width would be constant, and very small compared to the length and generally the line would be continuous. However, we would also anticipate linear widths of variable thickness along their length that may be particularly suitable for certain applications of the device for example when a hot stamping foil diffractive device is blocked onto rough paper (e.g. banknote paper) where it may useful to vary or thicken the line width locally to localise the patterns more to reduce degradation due to surface roughness or where the line is occasionally broken for example at interlocks and cross-over points with other graphics or to form a dashed line shape, for example—again where the device is substantially linear with small breaks of size comparable only to the line width. It should also be appreciated that the linear structures may be in the shape of lines, curves, circles or other suitable shaped graphics characterised that the structure is made up of a linear region within the dimensions given whose length is substantially greater than its width.

It should be appreciated that the scope of this invention is not just limited to surface relief embossed diffractive structures, but that the concept described herein of discrete line structure regions in a security device forming additional covert coherently viewable images formed at a distance from the device is equally applicable to other forms of holographic techniques such as reflection holography, based on interference layers, manufactured in such materials as photopolymers, silver halide, dichromated gelatin, etc. these applications and methodologies are included within the scope of this invention.

Another objective of this invention is to provide a covert device that spreads over a relatively larger proportion of the overall device than in previous systems for ease of authentication but whose optical microstructure is localised and generates a visually discerned image localised into discrete linear areas separate from the main visual security image to reduce degradation on the main security image. The device also has separate elements of the covert image localised and each corresponding to a discrete linear sections to reduce the diffractive bandwidth and fringe competition in these areas to ensure a high quality, low noise replay of the covert image and to ensure a reduction in fringe competition in these areas so that the covert image has approximately the same embossing characteristics as the main diffractive image to optimise the quality brightness and clarity of replay of the covert image. This linear localisation of the covert image information and distribution of its elements into separate linear regions allows this new device to provide a potentially higher information content for the covert image than previous devices by combining several such linear structures together so removing fringe competition and consequential image degradation constraints inherent in some of the previous systems.

Another specific objective of this invention is to also ensure that this device is easier to authenticate than previous devices because the linear regions extend over a relatively large area of the device making alignment for inspection much easier. These linear structure also have the advantage of spanning the largest possible area for ease of detection in one direction whilst also at any one interrogation point having a very small footprint in the other direction to minimise the degree of angular blurring and degradation and distortion on the out of plane image due to substrate distortion or roughness which has been a factor reducing the clarity of replay of the covert image in previous types of systems.

It should be appreciated that in a preferred embodiment the diffractive surface relief structure revealed here would be integrated as part of a main visual holographic or diffractive security image both to increase the complexity of the overall structure to increase its anti-counterfeit properties and also to conceal the presence of this new structure. Thus, under typical conditions one would anticipate interrogation and authentication by an inspector verifying the structure by illuminating it with for example a laser pointer pen and reconstructing the image on, for example, a simple hand held viewing screen. It is an object of this invention over prior systems to make this device easier to authenticate than previous devices so that an inspector need not necessarily align the pointer accurately to any particular region of the device and need not necessarily be aware of which components of the visual device are producing the covert image. It is also an objective of this invention over previous systems to potentially enable more information to be stored and to produce an associated visual effect of higher public recognition value than previous devices that would also be harder to manufacture and to reverse engineer due to the tighter optical constraints required than previously at the origination stage to optically record high quality, registered linear regions with these characteristics.

A useful and preferred embodiment of this invention is where the device consists of more than two linear regions and preferably several or many more such regions. The arrangement of such linear structures in terms of the visually viewable image could be in the form of an array of line structures formed as a set of line patterns, concentric rings, interlocking guilloche patterns or the like which would occupy a significant (5–10%) fraction of the area of a typical security hologram or the like (typical size 15×15 mm to 15×20 mm). The replay direction of each covert image and hence the angle of view of the visual parts of these images when the device is illuminated under white light will be designed so that upon tilting the device under white light illumination a viewer sees a defined and memorable visual event occurring due to the co-operation of the different directions of replay of the linear structures. Suitable memorable optical events could be for example an apparent expansion or contraction of a set of concentric line features in the form of a circle or rosette shape, for example, an apparent rotation around a guilloche line pattern or an apparent image switch on tilting the device where the shape defined by the line patterns mutates from on recognisable defined graphical or alphanumeric shape seen as a line shape to another different defined shape either in a sharp switching movement or a well defined switching movement.

One would also envisage that as well as animation of the visual feature, the covert feature would be apparently animated such that upon coherent laser illumination of the covert image feature of this device and rotation of the device in its plane a set of animated, changing covert images would be sequentially imaged onto a viewing screen. This would provide a higher security and more memorable covert feature that would be significantly more difficult to back engineer than previous devices as each part of the several components of the optical microstructure would effectively replay an image containing two focal planes, one focal plane containing a first linear visual image located at or near the real physical plane of the device for visual viewing and a focal plane for a second out of plane covert image containing a second, preferably different graphic located some distance (this distance typically large compared to the overall dimensions of the device and typically 150 mm to 300 mm) from the real plane of the device.

It can be appreciated that in the above more complex animated examples of this device not all of the elements need to replay covert images, but that standard holographic or diffractive structures can be mixed interchangeably with these linear structures that replay covert images under coherent light.

In this type of structure one would anticipate a guilloche pattern or design being a significant part or component of the design, say of 5–10 mm in size in one direction, possibly with the covert message bearing line structure forming part of this pattern (for example as a set of key-lines or underlines to a main or part of a diffractive or holographic image emblem). One could also envisage these linear structure forming a guilloche border area to a main design to form both a secure animated visual guilloche pattern coupled with an easily interrogated covert pattern designed for coherent reconstruction using a laser pen or the like.

One useful form of the structure has the main diffractive carrier grating spatial frequency of the covert image structures being less than that of the surrounding visual hologram (i.e. a larger carrier diffraction grating spacing) so that the covert images replay through a smaller diffraction angle than the main image to reduce image blur on the out of plane features and also to angularly separate then covert features the main visual image features to aid in ease of authentication.

Another useful embodiment of this concept would be where the linear structures replay a diffracted image at 90 degrees to the main diffractive security image. One could then envisage a device where the main diffractive image appeared without any degradation by any coherently viewable image replaying structures save for very fine dark line areas defining the areas corresponding to the structures containing covert coherently visualisable images. These areas containing coherently viewable image would replay their diffracted light visible on rotating the device through 90 degrees in its plane. This technique would enable the covert recordable structure to be spread over a large area of the device and to separate the viewing zone of the coherently visualised images away from the replay of the visual diffractive to further ease authentication with very little degradation on the main diffractive security image.

A particularly useful addition to the main invention cited here is the combination with it or similar features replaying coherently viewable covert images (for example block areas as opposed to linear regions or other forms of the prior art) of a second very small grating pitch diffraction grating structure also designed to replay an additional more specialised and more covert out of plane coherently visualised image. We would anticipate such a feature used in addition to the coherently viewable covert feature in this invention as a hidden highly secure forensic feature, designed for far more sophisticated authentication using a customised laser based viewer. The principle of operation would be that if this additional covert feature is recorded with a security diffractive or holographic image of a carrier grating spatial frequency considerably higher (i.e. smaller grating pitch) than the spatial frequency of the main holographic image, then as the pitch of the superimposed grating becomes smaller the first order angle of diffraction increases beyond the point that any replay can be seen from this element when the device is viewed along or near the normal even with a very steep reference beam angle for reconstruction. In fact what happens is that the first order diffracted angle becomes very large and the first order diffracted beam is actually directed back towards the illuminating source in a reconstruction geometry that when used in spectroscopic applications of diffraction gratings is known as the 'Littrow' geometry. In this geometry no evidence of this addition diffractive structure can be seen on the replay, when viewed in a normal configuration for visual viewing and the structure can only be detected in a 'Littrow' configuration. A very useful additional security feature is therefore to record an additional covert out of plane covert image recorded as a high spatial frequency carrier grating (smaller diffraction grating pitch c. 0.5 micron or less), and suitably this can be recorded as an all over superposition over the whole area of the device typically weaker than the main image so that very little visual evidence appears of this additional image. However, this additional forensic coherently viewable image can be revealed by the use of specialised and difficult to reproduce geometric viewing conditions under coherent illumination in a suitable 'Littrow' geometry (very steep illumination angle and image focussed in a near retro-reflection geometry) to provide an additional a highly secure covert out of plane image which can be recorded and detected to provide an additional extremely covert coherently viewable image. This thus provides another novel security device replaying a first coherently viewable set of hidden images designed to be covert but relatively easy to view by a suitably equipped observer and a second much more subtle covert and much harder to view forensic type of covert coherently viewable image, hidden and viewable only in a very particular high angle geometry by virtue of its high spatial frequency. In an alternative embodiment these very fine grating features (typically around or less than 0.5 micron in pitch) could be localised into discrete graphical elements visible on the image plane of the device, each replaying a separate covert image under suitable geometry 'Littrow' illumination in an analogous technique to the main invention here. Another advantage of using very fine grating structures is that they require particularly unusual and stable optical interference geometries to record and are technically not accessible to lower grade less well equipped holographic and diffractive manufacturers and so called "dot matrix" systems which makes these types of very fine grating structures extremely useful as additional forensic security feature.

This invention will now be illustrated with the help of schematic drawings to explain preferred embodiments and potential manufacturing methods.

FIG. 9 illustrates another example of the type of apparent movement and animation that could be created from this invention in this case showing an image mutation optical event combined potentially into a typical hologram of diffractive device security design showing the significant area of design and hence readability anticipated.

FIG. 10 illustrates various forms the coherently viewable image could take and what would be seen at various angles from the structure of FIG. 10 showing an animated shape change.

Figure 1:
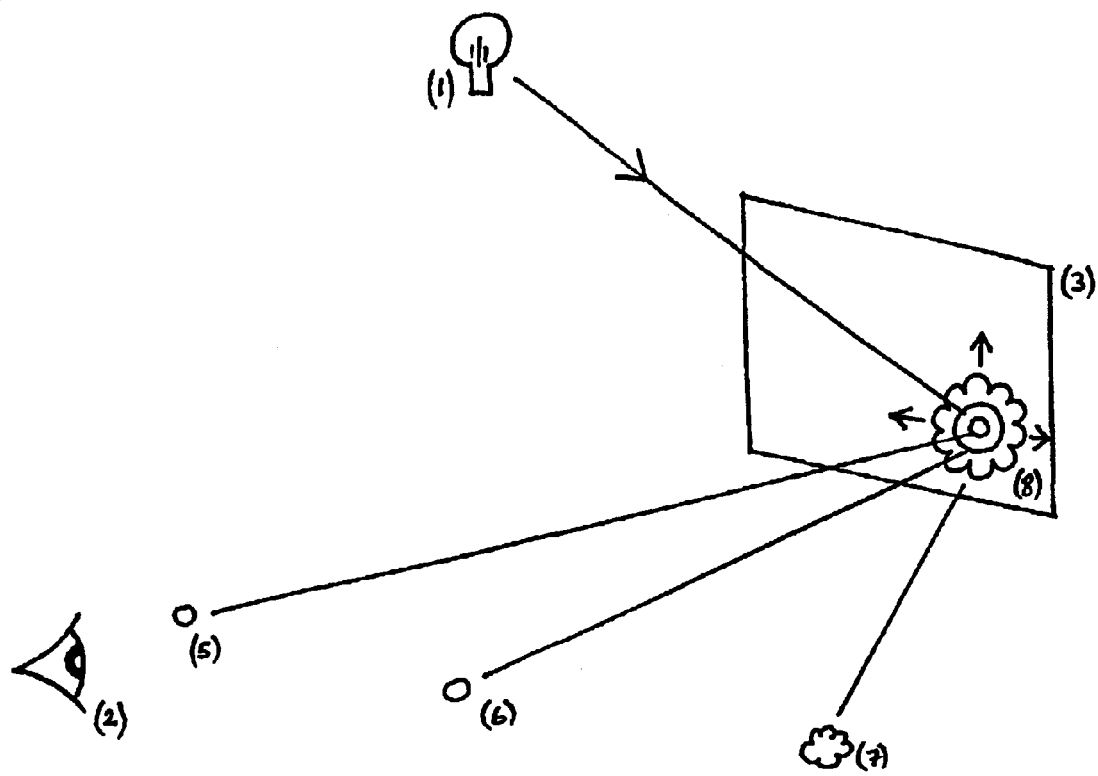
FIG. 1 illustrates the device, potentially as integrated as part of another diffractive security device such as a hologram and illustrates its behaviour under white light viewing.

The figures will now be explained in more detail:

FIG. 1 illustrates schematically the device (8), potentially as integrated as part of, but occupying a substantial region of, another diffractive security device such as a security hologram (3) and illustrates its behaviour under white light illumination form a spot light or other similar source (1) where the device replays for observation by an observer (2) a sequence of linear visual images (5,6,7) illustrating a defined optical event, in this case an expansion effect.

Figure 2:
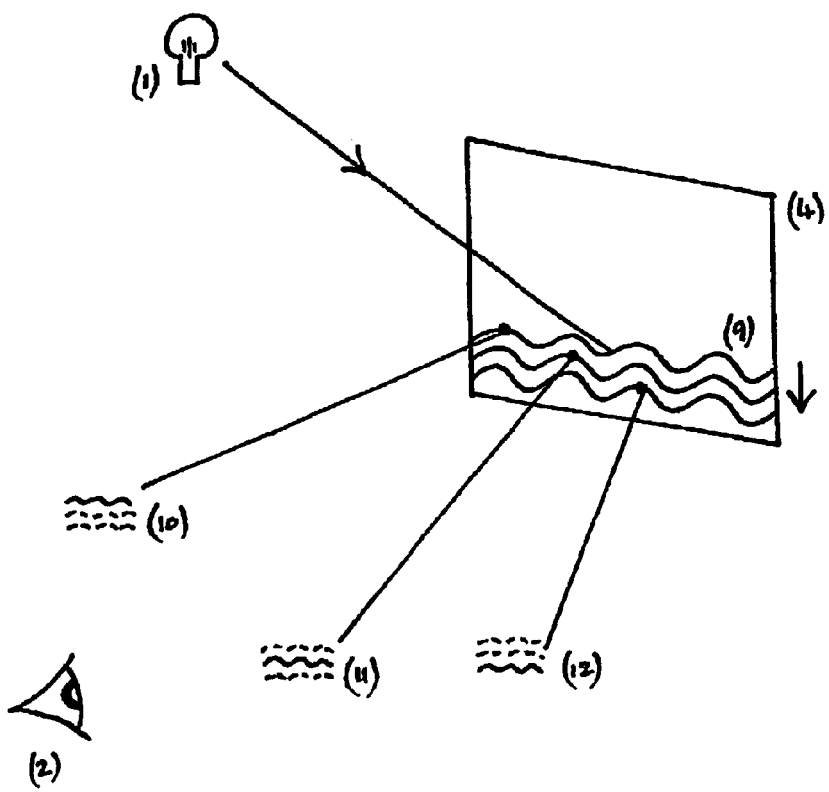
FIG. 2 illustrates a second form of the device and its white light illumination.

FIG. 2 illustrates a second form of the device (9) also integrated into another diffractive security device such as a hologram or 'Kinegram' (4), where the device occupies a large area of the overall security device to ease viewing in this case as a linear structure along one edge of the device. The figure illustrates the behaviour of the device replaying various visual linear images (10,11,12) to an observer (2) as the device is tilted under white light illumination from a source (1).

Figure 3:
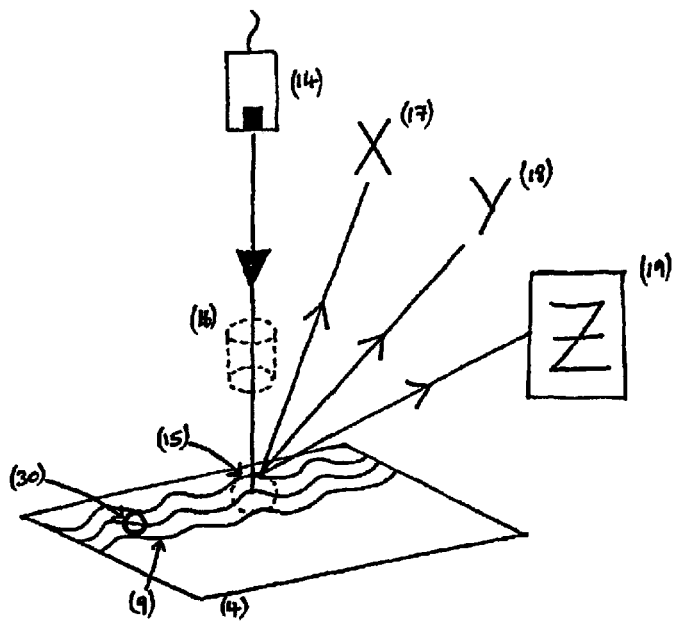
FIG. 3 illustrates the behaviour of the device of FIG. 2 under coherent laser illumination showing how the coherently viewable images can be reconstructed and imaged.

FIG. 3 illustrates the behaviour of the device of FIG. 2 (4) under coherent laser illumination (16) from a laser source such as a laser pen pointer (14) showing how the coherently viewable images (17,18,19) are reconstructed by the device far from its physical image plane and imaged onto, for example, a simple viewing screen (19). This shows how the linear regions of the visual device (15) reconstruct under coherent illumination different graphical covert images of shape X, Y, Z (17,18,19) each separated from the adjacent covert image by a distance at least comparable to its size (17,18) to increase visibility and also shows how the alignment of the coherent reconstruction beam (16) is not critical due to the relatively large areas of the overall device (4) occupied by the new device (9) making alignment and read-out considerably easier than in previous systems.

Figure 4:
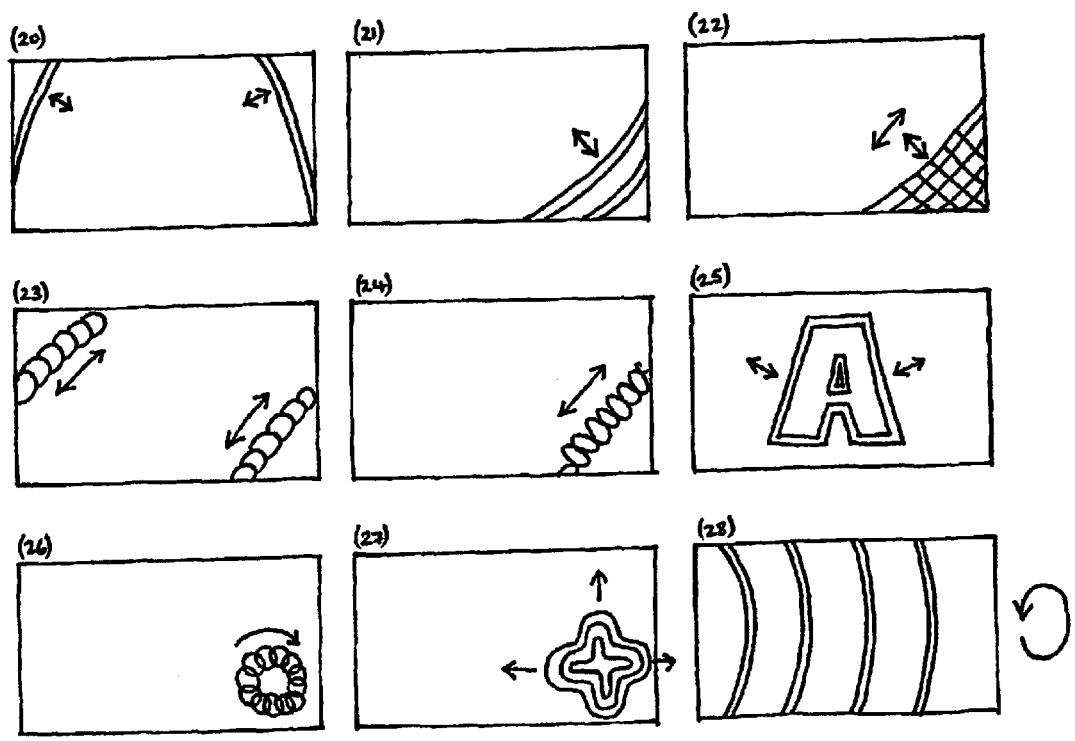
FIG. 4 illustrates examples of the forms that the linear regions could occupy in various typical examples normally where combined with another diffractive device such as a hologram.

FIG. 4 illustrates several graphical examples of the forms that the linear regions could occupy in various typical examples normally where combined with another diffractive device such as a hologram, each showing how the linear regions could be combined into a design to provide a large area for ease of authentication but also to avoid degradation of the overall design. This is because this new device is capable of producing attractive and memorable optical events so allowing a designer a greater freedom for design integration without degrading the overall effect and also making the coherent image more durable against localised surface damage of the overall device such as scratching of a security label, because the degree of disruption of an out of plan covert image in a scratched area would be much greater than the degradation to the near image plane visual security image so a larger area of redundancy is useful. These illustration also showing how animation effects and optical events generated by this new form device can be aesthetically designed in to add additional optical effects to the main device, a significant advantage enabling this new device to occupy a significant area of the whole device without reducing its visual security value and ideally enhancing this. Examples (20) and (21) show how the basic two element linear regions can be integrated into overall security devices to much larger areas of coherently viewable image area discretely. Examples (22) and (23) and (24) show how several such holographic diffractive structures can be combined together into a pattern to provide both coherently viewable covert images and to provide an enhanced area of visual security on a device to provide apparent movement and animation effects. Example (25) shows how such a device may be combined with other diffractive graphics by for example forming a discrete set of key-lines around a main graphical element. Example (26) and (27) shows how a nested complex line structure such as a guilloche pattern may be from such devices and used to provide apparent movement and animation effects such as rotations and expansions. Example (28) illustrates how the device could be made to reconstruct its images when the overall device is rotated by 90 degrees in its plane away from the replay direction of the primary diffractive image so allowing the device to be spread over a large area of the overall visual security device to make authentication particularly straight-forward.

Figure 5:
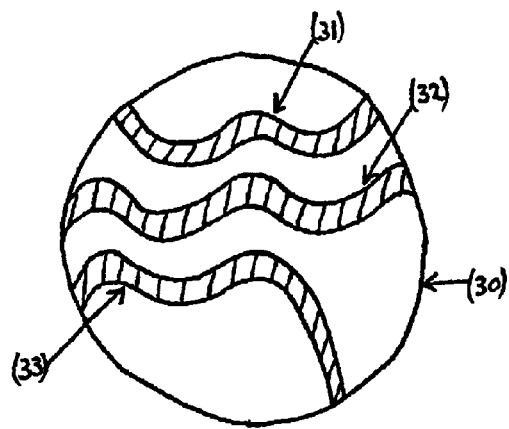
FIG. 5 illustrates a small area of FIG. 3 magnified showing how the linear regions would be organised to be co-located for ease of authentication by use of design and shape control.

FIG. 5 illustrates a small area of FIG. 3 magnified (30) to show how the linear regions (31,32,33) would be orga-nised to be co-located over part of their length for ease of authentication by use of design and shape control.

Figure 6:
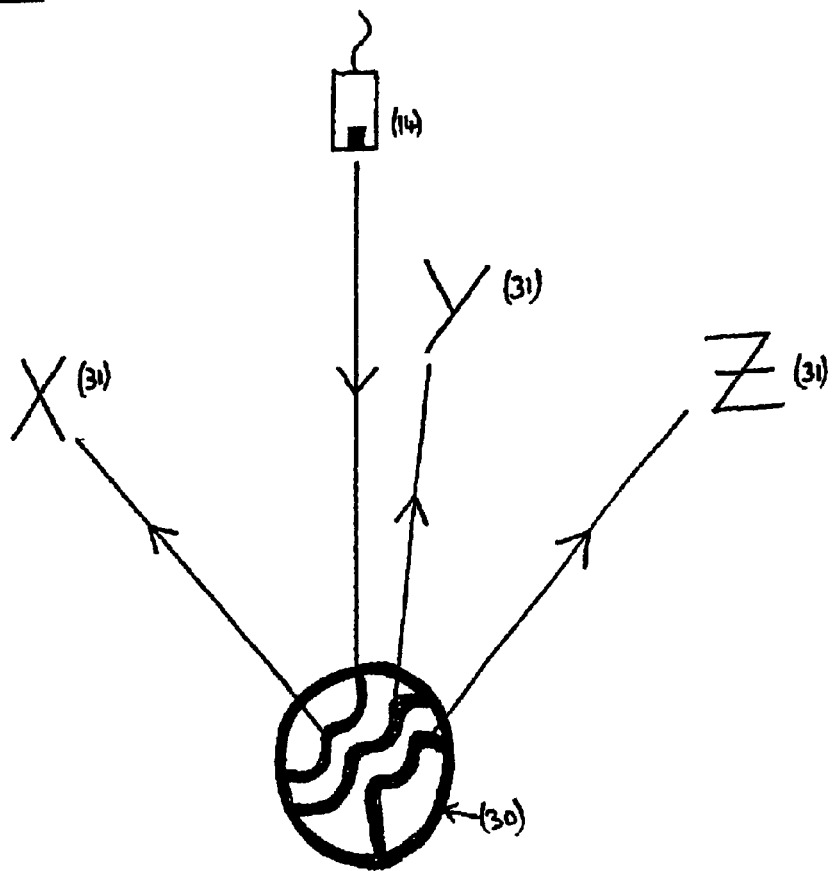
FIG. 6 illustrates how the regions of FIG. 5 would be read out with the circular area corresponding to an area comparable or smaller than the illuminating spot of the coherent light source.

FIG. 6 illustrates how the magnified region (30) illus-trated in FIG. 5 would reconstruct a set of covert coherently viewable images (31) under illumination with a suitable laser light source (14) with the circular area corresponding to an area comparable or smaller than the illuminating spot of the coherent light source showing how organising the graphical areas to be co-located over areas corresponding to typical reconstructing laser spot sizes ensuring ease of alignment of interrogation of the device ensuring reliable reconstruction of all of the covert images.

Figure 7:
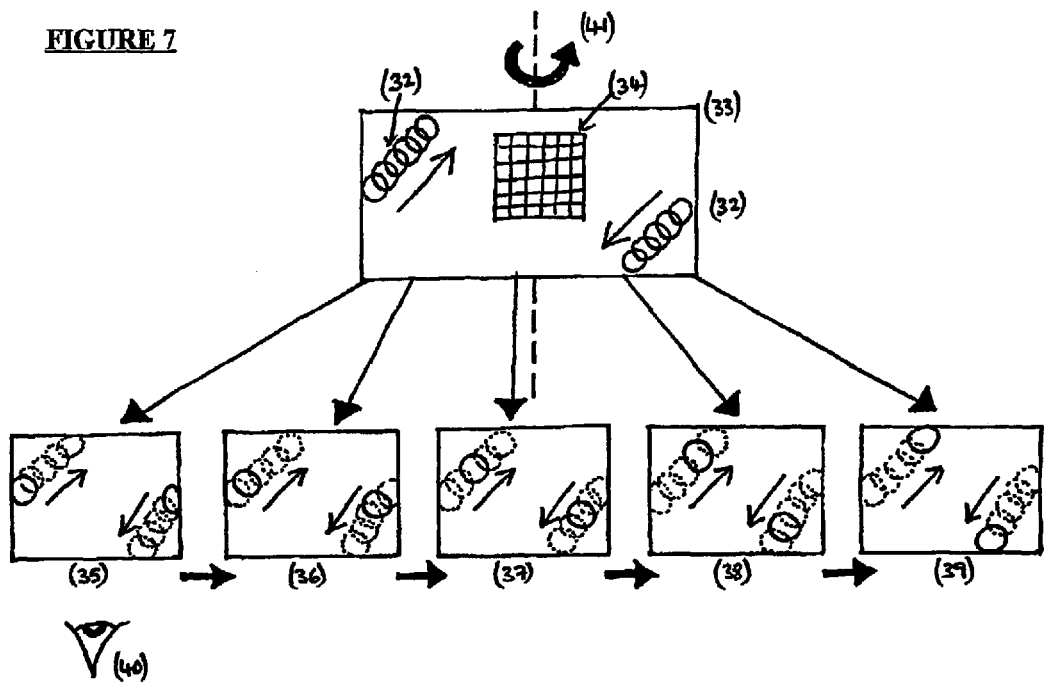
FIG. 7 illustrates the type of apparent movement and animation that could be created from this invention when combined into a typical security design showing the significant area of design and hence readability anticipated.

FIG. 7 illustrates the type of apparent movement and animation effects (35 to 39) that could be created from an example of this invention (32) when combined with a typical security diffractive or holographic design (34) in a single integrated device (33) showing the significant area of coher-ently viewable image (32) are stored in the design and hence readability anticipated. The illustrations (35 to 39) show a typical set of movement or animation effects that an observer would see on tilting the overall device (33) around an axis (41).

Figure 8:
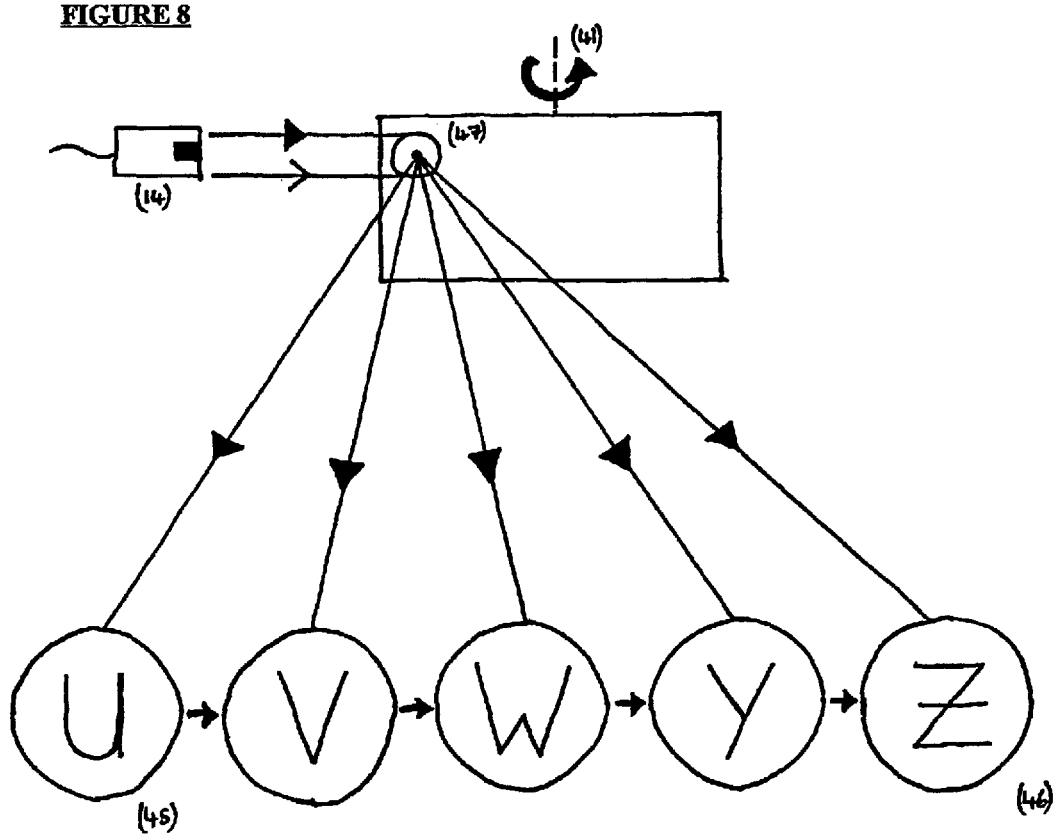
FIG. 8 illustrates various forms the coherently viewable image could take and what would be seen at various angles from the structure of FIG. 7.

FIG. 8 illustrates the structure of FIG. 7 under coherent illumination (14) of a portion of the coherently readable structure (32) showing examples of the various forms the corresponding coherently viewable images (set of 5 images 45 and 46) could take and what would be imaged at various angles on rotating the device around an axis (41). This illustrates that the animated lines structures (32) of FIG. 7 can potentially replay a large amount of covert information (45 and 46) that could be stored in a robust way distributed in an attractive pattern (32) spread over a relatively large area of the overall design to aid ease of authentication and robustness.

FIG. 9 is similar to FIG. 7 to illustrate another example of the type of apparent movement and animation that could be created from this invention (42) as seen by an observer (40) under white light illumination in this case showing a set of visual images displaying a sequence of images to give an image mutation optical event (shape change 43 and 44). This is combined potentially into a security holographic or dif-fractive device security design showing the significant area of design and hence readability anticipated.

FIG. 10 is similar to FIG. 8 illustrating for the structure of FIG. 10 the various forms the coherently viewable images (48, 49) could take when reconstructed (51) under coherent illumination (14) and what covert images (48, 49) would be seen at various angles from the device the showing an animated shape change (48, 49) in the covert image.

Figure 11:
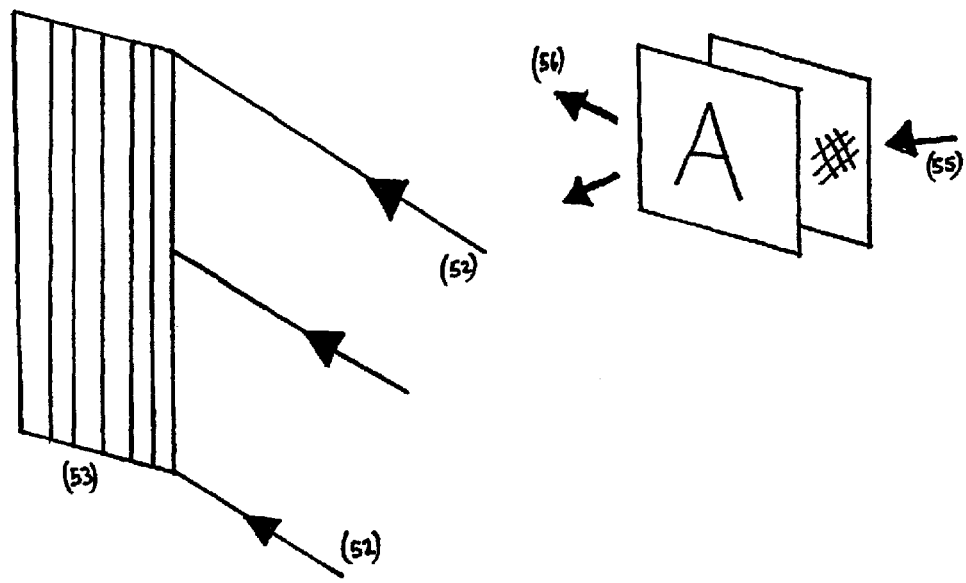
FIGS. 11 and 12 show one potential manufacturing process illustrating the H1 to H2 recording process form manufacturing a 'Benton' or rainbow hologram as known in the art.
Figure 12:
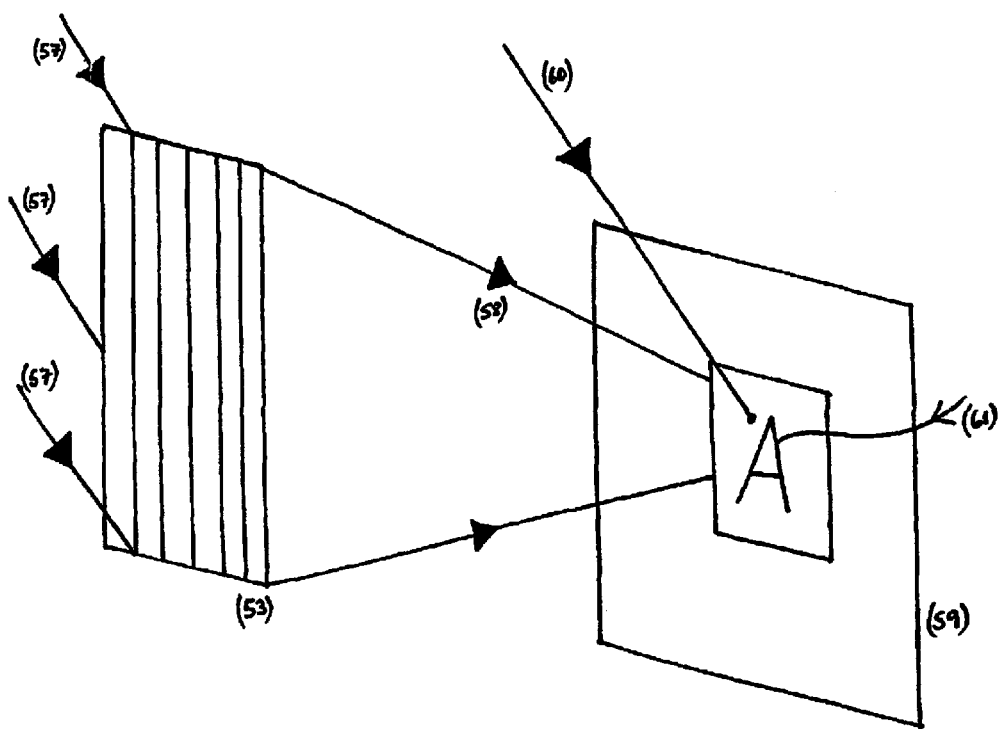

FIGS. 11 and 12 show one potential manufacturing process illustrating the H1 to H2 recording process for manufacturing a 'Benton' or rainbow hologram as known in the art. FIG. 11 illustrates schematically the recording pro-cess for recording an intermediate hologram or H1 as known in the art by exposing (and subsequently developing) a photosensitive recording medium (53) typically silver halide or photopolymer to a reference beam (52) and an object which in the case of a 2D–3D hologram as known in the art would consist of a back-lit diffusing element (55) and a aperture mask defining the artwork element (54). FIG. 12 illustrates the transfer process as known in the art to take the H1 (53) as recorded in FIG. 11, re-illuminate it with a reference beam (57) conjugate to the original reference beam to thus reconstruct a real projected image (61) of the original object. The projected image (61) is focussed at or near the plane of a second recording medium (59) according to the type of image plane and movement and depth features required, the second recording medium (59) being typically for an embossed hologram or diffractive element a material capable of recording a diffractive image as a surface relief structure and would typically be a photoresist material. A second reference beam is then introduced (60) to record a second or H2 hologram. It can be appreciated that several such devices can be superimposed or recorded adjacent to each other and that one H1 containing several such recordings or several H1's or a mixture of projection and other masking techniques as known in the art (e.g. U.S. Pat. Nos. 4,918,469, 4,717,221, 4,629,282). To form an embossed hologram the H2 hologram formed in photoresist would be silvered to deposit a conductive layer, copied probably several times in a plating process as known in the field to form metal copies of the structure and then roll embossed into a plastic material or embossing lacquer or hot foil material or similar and then metallised to form an embossed hologram as known in the art.

Figure 13:
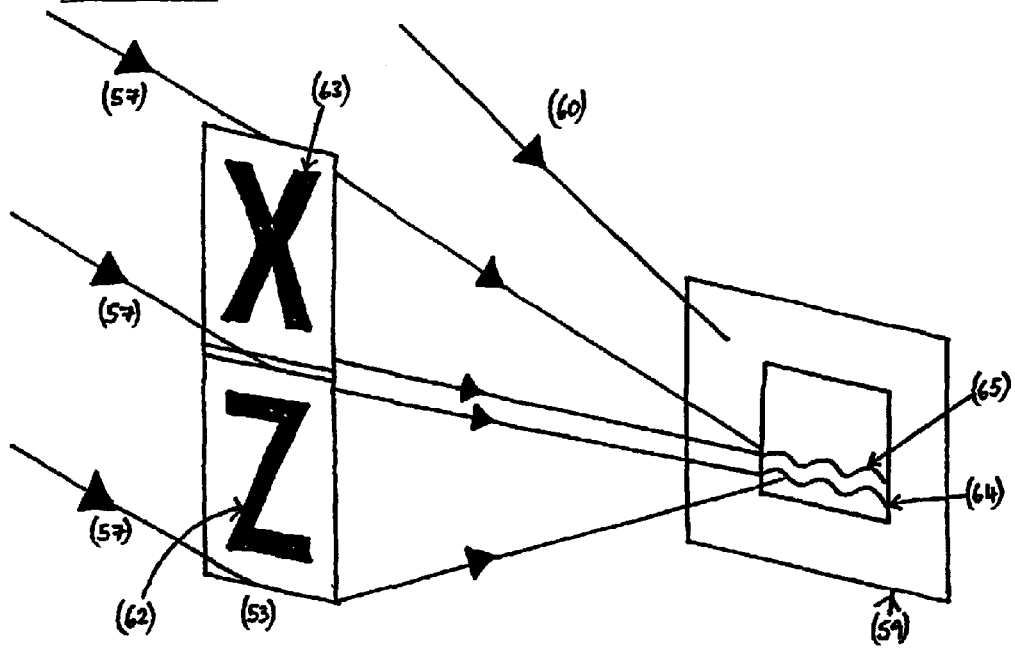
FIG. 13 illustrates how this process may be adapted for recording the device taught in this invention.

FIG. 13 illustrates how the process illustrated in FIGS. 11 and 12 may be adapted for recording the device taught in this invention. In this illustration a standard H1 would be recorded as in FIG. 11. However, on transfer at the H2 stage on reconstruction with the reference beam (57) instead of masking the H1 (53) to form a rainbow or 'Benton' slit a mask (63) would be used at or near the plane of the H1 to define the form of the covert image corresponding to the visual image being projected from that area of the H1 onto the H2 recording plane (59). So for FIG. 13 the mask 'X' (63) corresponds to the area of the image into which the visual image plane artwork of one line structure has been recorded (65), whilst a second masked area on the H1 the mask 'Z' masks out to define another out of plane covert image for the second linear image plane structure (64) recorded into that section of the H1. After masking the H2 exposures and development would be substantially as for FIGS. 11 and 12. It can be appreciated that several such structures can be combined together and that the steps of FIGS. 11, 12 and 13 can be combined together into a single step or sequentially to from complex composite structures containing this invention and all forms of security holograms and other diffractive structures. It can also be appreciated that these structures can be combined together into more complex structures by other means such as mechanical recombining. It can also be appreciated that the recording method of FIG. 13 is not exhaustive and an alternative technique as known on the art would be to use an image plane mask over the photoresist H2 plane to define the area of artwork to be exposed and to replace the masked H1 of FIG. 13 with a masked diffuser using a similar process to U.S. Pat. Nos. 4,918,469, 4,717,221, 4,629,282 for example.

Figure 14:
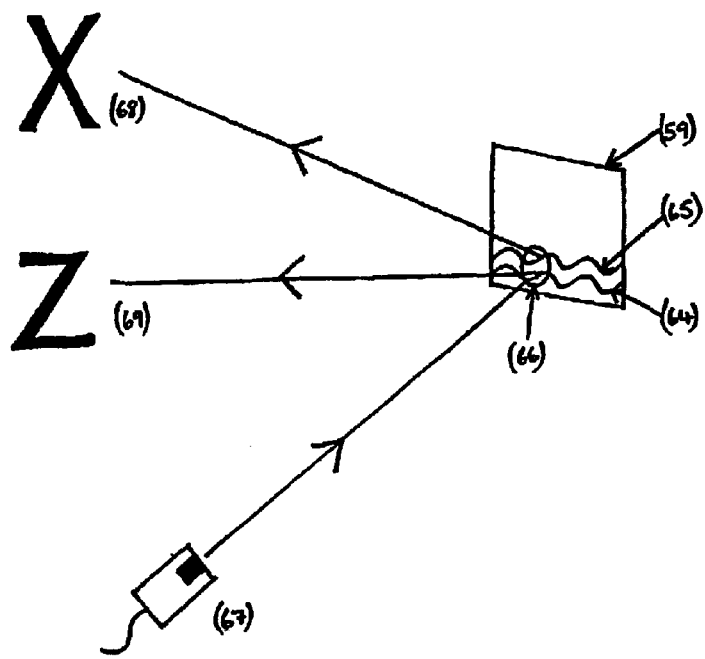
FIG. 14 illustrates the form of the coherently viewable image obtained from the device shown being recorded in FIG. 13 and also shows the shape of the linear regions recorded that would replay in the visual image.

FIG. 14 illustrates the form of the coherently viewable images (68, 69) obtained from the device (59) shown being recorded in FIG. 13 when under coherent illumination (67) and also shows the shape of the corresponding linear regions (64,65) recorded that would replay under white light illumination a visual image.

Figure 15:
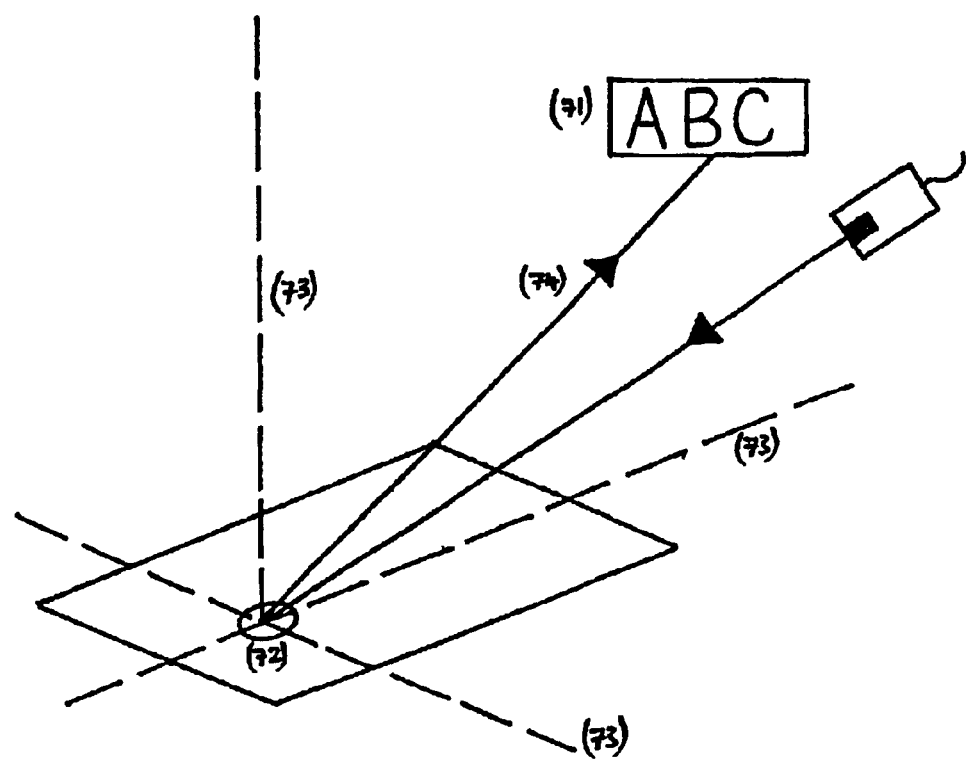
FIG. 15 illustrates the 'Littrow' coherent read-out and reconstruction geometry for the additional forensic covert out of plane feature.

FIG. 15 illustrates the 'Littrow' coherent read-out and reconstruction geometry for the additional forensic covert out of plane feature. The feature area (72) is illuminated with a coherent beam from a laser source (70) at a very steep angle to a normal contained in a reference frame (73) defining the plane of the device and a normal to this surface. The coherently viewable image (71) from this additional fine diffractive forensic feature is reconstructed also at a very steep angle (74) to the normal to form a reconstructed out of plane image very close to the laser illumination direction (70) making this device non-visible in terms of visual image replay under white light under virtually all conditions of normal observation.

What is claimed is:

1. An optical device comprising a holographic diffractive structure comprising at least two discrete linear regions arranged to replay in response to white light illumination a visual holographic optically variable image comprising a plurality of visually discernable linear graphical elements corresponding to the at least two discrete linear regions, wherein the graphical elements are located at or near the physical plane containing the holographic diffractive structure, and arranged to replay in response to coherent light illumination a plurality of secondary covert images corresponding to the at least two discrete linear regions wherein the secondary covert images are visible to an observer when imaged at a separate image plane away from the physical plane containing the holographic diffractive structure, the plurality of secondary covert images being arranged to be non-visible under white light illumination, and wherein the secondary covert images are reconstructed at different positions at their image plane.

2. An optical device as claimed in claim 1, wherein the at least two discrete linear regions are arranged adjacently and/or contiguously.

3. An optical device as claimed in claim 1, wherein the secondary covert images are separated by at least a distance equal to the dimensions of the secondary covert images when imaged at the separate image plane.

4. An optical device as claimed in claim 1, wherein the secondary covert images comprise alphanumeric characters.

5. An optical device as claimed in claim 1, wherein the holographic diffractive structure is formed as a continuous structure.

6. An optical device as claimed in claim 1, wherein the holographic diffractive structure is in the form of a surface relief structure.

7. An optical device as claimed in claim 1, wherein the at least two discrete linear regions are arcuate or circular in shape.

8. An optical device as claimed in claim 1, wherein the at least two discrete linear regions are in the shape of alphanumeric characters.

9. An optical device as claimed in claim 1, wherein the at least two discrete linear regions have a length to width ratio of at least 5 to 1.

10. An optical device as claimed in claim 1, wherein the at least two discrete linear regions are arranged adjacently for a substantial proportion of their length.

11. An optical device as claimed in claim 1, wherein the at least two discrete linear regions are arranged to be any one of, or any combination of, closely parallel, interlocked or intertwined.

12. An optical device as claimed in claim 1, wherein the at least two discrete linear regions have a width dimension between 0.1 and 0.75 mm.

13. An optical device as claimed in claim 1, wherein the holographic diffractive structure comprises one of a plurality of holographic diffractive structures, and wherein the holographic diffractive structures are arranged such that under white light illumination the replay characteristics of the visually observable holographic images co-operate to provide a defined visual event for observation upon tilting the device and/or the observer changing his observation position.

14. An optical device as claimed in claim 13, wherein the visual event comprises an apparent expansion and contraction effect.

15. An optical device as in claimed in claim 13, wherein the visual event comprises an apparent rotation of a guilloche line pattern.

16. An optical device as in claimed in claim 13, where the visual event comprises a mutation of an image from one defined shape to another.

17. An optical device as in claimed in claim 13, where the visual event comprises an animation.

18. An optical device as claimed in claim 1, wherein the plurality of secondary covert images formed under coherent light illumination co-operate to provide a defined visual event replayed by rotating the optical device in its plane and/or by the observer changing his observation position.

19. An optical device as claimed in claim 1, wherein the holographic diffractive structure is integral with a security hologram or security diffraction grating device, and wherein the security hologram or security diffraction grating device replays in response to white light illumination a holographic or diffractive image visible to an observer for authentication.

20. An optical device as claimed claim 19, wherein the holographic diffractive structure occupies at least 5% of the surface area of the optical device.

21. An optical device as claimed in claim 19, wherein the holographic diffractive structure upon illumination by coherent light diffracts light at a smaller angle to the normal to the physical plane of the device than the diffracted light from the security hologram or security diffraction grating device.

22. An optical device as claimed in claim 19, wherein the holographic diffractive structure replays in response to white light illumination a visually observable holographic image in a direction at 90 degree rotation to the direction in which the security hologram or security diffraction grating device replays its visually discernable image.

23. An optical device as claimed in claim 1, comprising an additional diffractive structure of substantially smaller diffraction grating carrier pitch and arranged to replay under coherent light illumination in a Littrow geometry an additional covert image focused at a separate plane in a direction near the direction of illumination and visible to an observer, wherein under white light illumination the additional covert image is substantially not focusable and the image is non-visible to an observer.

24. An optical device as claimed in claim 23, wherein the image replayed in a Littrow geometry comprises alphanumeric characters.

25. An optical device as claimed in claim 23, wherein the additional diffractive structure is superposed upon the other diffractive structures and is arranged to be substantially non-visible under white light illumination.

26. An optical device as claimed in claim 23, wherein the additional diffractive structure is located in discrete regions of the optical device and arranged to replay under white light illumination a visually discernable graphical element located at or near the physical plane of the optical device when observed from a direction close to the direction of illumination.

27. An optical device as claimed in claim 1 and manufactured using rainbow holographic H1 to H2 transfer techniques.

28. An optical device as claimed in claim 1 and manufactured using holographic optical masking techniques.

29. An optical device as claimed in claim 1 and comprising an optical security device.

* * * * *